No. 871,098. PATENTED NOV. 19, 1907.
M. ALBRECHT.
MEANS FOR DRIVING MOTOR ROAD VEHICLES.
APPLICATION FILED FEB. 20, 1907.
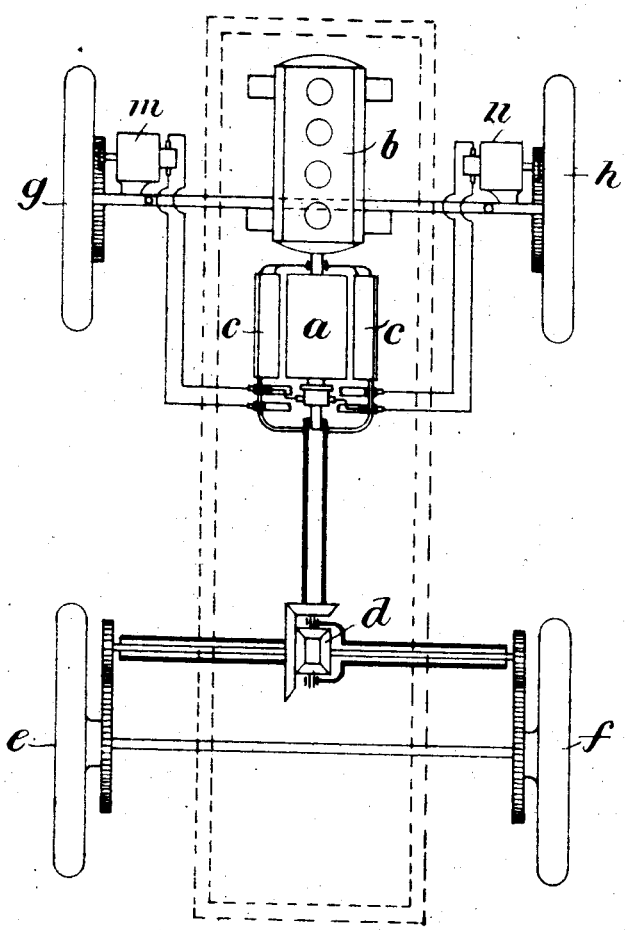

UNITED STATES PATENT OFFICE.

MARTIN ALBRECHT, OF FRIEDBERG, GERMANY, ASSIGNOR TO FELTEN & GUILLEAUME-LAH-MEYERWERKE ACTIEN-GESELLSCHAFT, OF FRANKFORT-ON-THE-MAIN, GERMANY.

MEANS FOR DRIVING MOTOR ROAD-VEHICLES.

No. 871,098.  Specification of Letters Patent.  Patented Nov. 19, 1907.

Application filed February 20, 1907. Serial No. 358,468.

*To all whom it may concern:*

Be it known that I, MARTIN ALBRECHT, a subject of the German Emperor, and a resident of Friedberg, in the Grand Duchy of Hesse, Germany, have invented certain new and useful Improvements in Means for Driving Motor Road-Vehicles and the Like, of which the following is a specification.

This invention has for its object to provide as elastic a drive as possible for three, four, or more, wheels in motor road vehicles and the like.

Means are already known for driving more than two vehicle wheels by means of electro-motors, a dynamo machine driven by a petrol motor supplying current to the driving electro-motors.

The invention has for its object to provide a single means for transmitting both electrical and mechanical energy for propelling the vehicle thereby obtaining a material reduction in the weight and cost of the mechanism.

The accompanying drawing illustrates an example of the application of the invention to vehicles with four driving wheels. The working motors $b$ of the vehicle may be connected directly with the armature $a$ of an electric gear-clutch. The magnet frame of the electric gear-clutch can rotate and is directly connected to the differential $d$, from which power may be transmitted to the rear wheels $e$ and $f$ for instance. It is obvious that the armature and magnet frame can always be exchanged one for the other and that the differential gearing may be dispensed with by arranging two electric gear-clutches and connecting each with one of the wheels.

As soon as the armature $a$ rotates in the magnetic field, electric currents are produced in the armature in accordance with the theory of dynamo electric machines. These currents are then transmitted to motors $m$ and $n$ driving the front wheels $g$ and $h$. If more than four wheels are to be driven, this can be effected by arranging a greater number of motors, or electric gear-clutches, or of both motors and electric gear-clutches.

As current is being taken from the electric gear-clutch, the magnet frame tends to rotate and to transmit work to the wheels connected to it.

Claim:—

1. In a motor car, the combination of a plurality of independent driving wheels, a prime motor $b$, an electric generator, differential gearing connected with one element of said generator, and with two of the driving wheels, and electric motors adapted to be energized by said generator and arranged to drive others of said wheels.

2. In a motor car, the combination of two parallel axles, a plurality of driving wheels independently mounted on each axle, a prime motor $b$, an electric generator, a differential gear mechanically connected with one member of said generator, means mechanically connecting said gearing with the wheels on one axle, and electrically operated means in circuit with said generator and adapted to drive the wheels on the other axle.

In testimony whereof I have signed my name to this specification in the presence of two subscribing witnesses.

MARTIN ALBRECHT.

Witnesses:
ERWIN DIPPEL,
MICHAEL VOLK.